(12) United States Patent
Kersting et al.

(10) Patent No.: US 9,399,684 B2
(45) Date of Patent: Jul. 26, 2016

(54) METHOD FOR ADJUSTING THE AVERAGE PARTICLE SIZE OF A SPHERICAL CATALYST SUPPORT

(71) Applicant: Clariant Produkte (Deutschland) GmbH, Frankfurt am Main (DE)

(72) Inventors: Meinolf Kersting, Pullach (DE); Christian Gueckel, Grafing (DE); C. P. Cheng, Shanghai (CN); Liu Yanxia, Shanghai (CN)

(73) Assignee: CLARIANT INTERNATIONAL LTD., Muttenz (CH)

( * ) Notice: Subject to any disclaimer, the term of this patent is extended or adjusted under 35 U.S.C. 154(b) by 474 days.

(21) Appl. No.: 13/901,902

(22) Filed: May 24, 2013

(65) Prior Publication Data
US 2013/0331529 A1    Dec. 12, 2013

(30) Foreign Application Priority Data
May 25, 2012   (EP) .................................. 12004083

(51) Int. Cl.
  C08F 2/00    (2006.01)
  B01J 31/00   (2006.01)
  C08F 4/76    (2006.01)
  C08F 10/00   (2006.01)

(52) U.S. Cl.
  CPC .. C08F 4/76 (2013.01); C08F 10/00 (2013.01)

(58) Field of Classification Search
  CPC .................................. C08F 2/00; B01J 31/00
  USPC .................................... 502/172; 526/210, 212
  See application file for complete search history.

(56) References Cited

U.S. PATENT DOCUMENTS

| 4,315,874 | A  | 2/1982  | Ushida et al.  |
| 4,399,054 | A  | 8/1983  | Ferraris et al.|
| 4,469,648 | A  | 9/1984  | Ferraris et al.|
| 6,962,889 | B2 | 11/2005 | Zhu et al.     |
| 7,135,531 | B2 | 11/2006 | Zhu et al.     |

FOREIGN PATENT DOCUMENTS

| DE | 29 24 029       A1 |   | 12/1979 |           |
| EP | 0 018 737       A1 |   | 11/1980 |           |
| EP | 0 556 815       A1 |   | 8/1993  |           |
| EP | 0 700 936       A1 |   | 3/1996  |           |
| EP | 1 669 375       A1 |   | 6/2006  |           |
| IT | WO 2011042269   A1 | * | 4/2011  | C08F 10/06|
| WO | WO 2011/042269  A1 |   | 4/2011  |           |

OTHER PUBLICATIONS

European Search Report Application No. EP 12 00 4083 dated Oct. 8, 2012.

* cited by examiner

*Primary Examiner* — Alexa Neckel
*Assistant Examiner* — Elizabeth Eng
(74) *Attorney, Agent, or Firm* — Anthony A. Bisulca

(57) ABSTRACT

A method for adjusting the average particle size of a spherical catalyst support, in particular a spherical catalyst support comprising a magnesium dihalide-ethanol-adduct, a spherical catalyst support obtained by the method, a solid catalyst composition comprising the spherical catalyst support, and the use of the solid catalyst composition for the polymerization of an olefins.

11 Claims, 1 Drawing Sheet

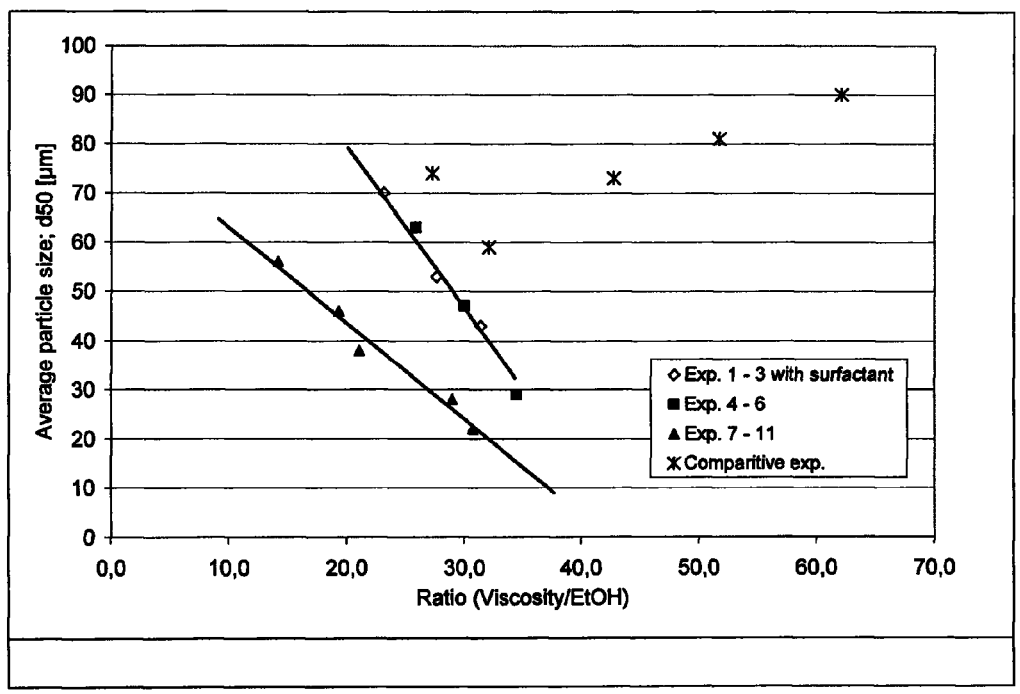

METHOD FOR ADJUSTING THE AVERAGE PARTICLE SIZE OF A SPHERICAL CATALYST SUPPORT

CROSS-REFERENCE TO RELATED APPLICATIONS

This is a U.S. application claiming priority benefit of European Patent Application Number 12 004 083.7 (filed May 25, 2012), the content of such application being incorporated herein by reference.

BACKGROUND

The present invention relates to a method for adjusting the average particle size of a spherical catalyst support, in particular a spherical catalyst support comprising a magnesium dihalide-ethanol-adduct, a spherical catalyst support obtained by the method, a solid catalyst composition comprising the spherical catalyst support, and the use of the solid catalyst composition for the polymerization of an olefins.

It is known that spherical solid catalyst compositions for the polymerization of α-olefins are favorable, since the obtained olefin polymer usually reproduces the shape of the catalyst component. A spherical shaped olefin polymer powder has a high bulk density and is easy to handle in polymerization plants. In particular, the pneumatic conveying of the olefin polymer powder is positively affected by the spherical shape. Over the last four decades the improvement of the preparation method for spherical catalyst supports comprising a magnesium compound and an alcohol being used to prepare said spherical solid catalyst compositions was subject of many publications.

For example, U.S. Pat. No. 4,399,054 describes a method for preparing spherical catalyst supports for propylene polymerization catalysts with defined physical properties by forming an emulsion of a magnesium dihalide-alcohol adduct with an inert liquid at an elevated temperature and quenching the emulsion to cause rapid solidification of the adduct in form of spherical particles. The inert liquid should be immiscible with the adduct and inert towards reaction with the adduct. The temperature should be high enough to melt the adduct in the inert liquid. The examples disclose vaseline oil either alone or as a mixture with a silicone oil as the preferred inert liquid for the preparation of the supports.

Another method for the preparation of spherical catalyst support particles is described in DE 2924029. The method consists of the following steps: a) Forming a homogenous mixture comprising a $MgCl_2$-alcohol adduct and an inert liquid, b) pumping the emulsion through a tube with defined dimensions under turbulent flow and c) cooling the emulsion rapidly to solidify the adduct by immersing it into a cooled liquid. DE 2924029 also discloses the linear velocity of the emulsion in the tube and the surface tension between the adduct and the inert liquid as critical parameters which determine the size of the spherical particles. The inert liquids used for the formation of the emulsion are kerosene and vaseline oil. Overall, the method is similar to the method described in U.S. Pat. No. 4,399,054.

EP 0 018 737 also discloses a method for the preparation of spherical catalyst supports. The method includes the addition of at least one auxiliary component selected from the group of surface-active agents, which are not siloxanes, and the group of siloxanes to the molten adduct suspended in an inert hydrocarbon liquid. After vigorous stirring for a certain period, the mixture is quenched to solidify the spherical particles of the adduct.

A spray drying method for the preparation of large spherical catalyst support particles of an adduct is disclosed in EP 0 700 936 B1. This method includes a dealcoholation step at reduced pressure.

Yet another method is disclosed in U.S. Pat. No. 6,962,889, which includes the use of alkyl silicates to form spherical particles of an adduct with relatively large size. The alkyl silicate, for example tetraethyl orthosilicate, is added to a solution of $MgCl_2$ in an alcohol, usually ethanol. After proper mixing, a certain amount of an inert hydrocarbon liquid can be added to the above described solution to get an emulsion of the adduct. Finally, the solution or emulsion is transferred into cooled hexane to solidify the adduct and yield spherical particles having a relatively large particle size.

U.S. Pat. No. 7,135,531 describes a method for the preparation of spherical catalyst supports. The method comprises the use of an ether, a surfactant and an alkyl silicate to form spherical $MgCl_2$-alcohol adducts. The combination of an ether, a surfactant and an alkyl silicate positively influences the formation of spherical particles having a controllable average particle size.

All prior art methods for the production of spherical catalyst supports comprising an $MgCl_2$-alcohol adduct are more or less complicated and cannot be used to prepare spherical catalysts with controllable small average particle sizes and at the same time preferably also a comparatively narrow particle size distribution.

SUMMARY

Thus, the object of this invention was to provide a method for preparing spherical catalyst supports having a comparatively small average particle size and at the same time preferably a comparatively narrow particle size distribution in a controllable manner.

The above object is achieved by a method for adjusting the average particle size of a spherical catalyst support, comprising the steps:
a) providing a liquid which is immiscible with a $MgHal_2$-ethanol-adduct;
b) adding $MgHal_2$, wherein Hal is selected from the group consisting of Cl, Br and F, to the liquid and dispersing it therein;
c) adding ethanol to the dispersion obtained in step b) in an amount β [mol/mol $MgHal_2$], such that ν [cP]/β [mol/mol $MgHal_2$] is in a range of 13 to 35, to form a $MgCl_2$-ethanol-adduct, and heating the obtained mixture such that the $MgHal_2$-ethanol-adduct is molten, wherein ν [cP] is the viscosity of the liquid provided in step a);
d optionally adding a surfactant comprising ethers, glycol ethers, polyethers (glycols), alcohols, silicates, borates and phosphates;
e) adding the mixture obtained in step c or d) to the same liquid as used in step a) heated such that the $MgHal_2$-ethanol-adduct is kept in the molten state, and homogenizing the obtained mixture; and
f) transferring the homogenized mixture obtained in step e) into a hydrocarbon liquid cooled to a temperature in a range of −30° C. to 0° C.

The method according to the present invention enables the production of a spherical catalyst support having a controlled small average particle size and preferably also a comparatively narrow particle size distribution, even if parameters like stirring power and plant design cannot be adjusted in order to achieve different average particle sizes, as disclosed in the prior art.

The present inventors found that in a given selected solvent system, the viscosity and the amount of ethanol and optional additives added to the reaction system have a direct relationship to the average particle size expressed as the $d_{50}$, of the spherical catalyst support obtained by the present method. Furthermore, the present method yields spherical catalyst supports preferably having a comparatively narrow particle size distribution, expressed as the span. The span is defined by following equation:

$$\text{span} = (d_{90} - d_{10})/d_{50},$$

wherein $d_{10}$, $d_{50}$ and $d_{90}$ are the equivalent volume diameters at 10%, 50% and 90% cumulative volume, respectively, as it is well known to the skilled person.

BRIEF DESCRIPTION OF THE DRAWINGS

FIG. 1 shows correlations between average particle size $d_{50}$ and the viscosity—EtOH ratio for examples 1-11 and comparative examples 1-5.

DETAILED DESCRIPTION

In more detail, the viscosity of the liquid, the viscosity of the MgHal$_2$-ethanol-adduct and the amount of ethanol and optional surfactant added to the mixture of MgHal$_2$ and ethanol has a direct relationship to the average particle size of the obtained spherical catalyst support and, therefore those parameters can be adjusted to produce a spherical catalyst support with the desired average particle size. In general, the relationship of the above-mentioned parameters can be described by the following equation:

$$d_{50} \sim v/(v_{adduct}, \beta_{EtOH}, \beta_{Surfactant}),$$

wherein v is the viscosity of the liquid, $v_{adduct}$ is the viscosity of the MgHal$_2$-ethanol-adduct, and $\beta_{EtOH}$ and $\beta_{Surfactant}$ are the amounts of ethanol and surfactant added, respectively.

Furthermore, it has been found that the viscosity of the MgHal$_2$-ethanol-adduct is mainly affected by the amount of ethanol and optional surfactant added to the reaction mixture and, therefore the above equation can be simplified as follows:

$$d_{50} \sim v/(\beta_{EtOH}, \beta_{Surfactant})$$

Thus, the present inventors found that the average particle size $d_{50}$ of the spherical catalyst support has a linear relationship to the $v/\beta_{EtOH}$ ratio. Furthermore, it has been found that by increasing said ratio spherical catalyst supports having a smaller $d_{50}$ can be obtained and vice versa. Thus, said linear relationship enables to provide particles of the spherical catalyst support having a defined average particle size.

Surprisingly, the change of the molar ratio of the ethanol has no impact on the final ethanol content of the spherical catalyst support under similar conditions.

The viscosity of the liquid is affected by the characteristics of the compound constituting the liquid. It is preferred that the liquid is an oily liquid. The present inventors found that any liquid can be used according to the present invention as long as the liquid is immiscible with the MgHal$_2$-ethanol-adduct formed in step c). It is furthermore preferred that the liquid is inert towards a reaction with the spherical catalyst formed. Suitable liquids used in the process according to the invention are silicone oils, aliphatic hydrocarbons having at least 8 carbon atoms and aromatic hydrocarbons having at least 6 carbon atoms.

Suitable silicone oils can be selected from the group consisting of linear polysiloxanes and cyclopolysiloxanes.

Examples for linear polysiloxanes can preferably be selected from the group consisting of polydimethylsiloxane, polydiethylsiloxane, polydipropylsiloxane, polymethylphenyl-siloxane, polymethylhydrogensiloxane, polyhexamethyldi-siloxane, polydecamethyltetrasiloxane, polytetracosamethyl-undecasiloxane, poly-3-hydroheptamethyltrisiloxane, poly-3,5-dihydrooctamethyltetrasiloxane, poly-3,5,7-trihydrononame-thylpentasiloxane, polytetramethyl-1,3-diphenyldisiloxane, polypentamethyl-1,3,5-triphenyltrisiloxane, polyheptaphenyl-disiloxane and polyoctaphenyltrisiloxane.

Examples for cyclopolysiloxanes can preferably be selected from the group consisting of poly-2,4,6-trimethyl-cyclotrisiloxane, poly-2,4,6,8-tetramethylcyclotetra-siloxane, polyhexamethylcyclotrisiloxane, polyoctamethylcyclo-tetrasiloxane, polydecamethylcyclopentasiloxane, polydodeca-methylcyclohexasiloxane, polytriphenyl-1,3,5-trimethylcyclo-trisiloxane, polyhexaphenylcyclotrisiloxane and polyocta-phenylcyclotetrasiloxane.

Aliphatic hydrocarbons having at least 8 carbon atoms may be saturated or unsaturated linear, branched or cyclic aliphatic hydrocarbons. Preferably the aliphatic hydrocarbons are saturated linear or branched hydrocarbons, such as for instance octane, nonane, decane, dodecane, etc. and their structural isomers, or mixtures thereof.

Aromatic hydrocarbons having at least 6 carbon atoms may be aromatic or heteroaromatic hydrocarbons having one or more aromatic cores. Suitable aromatic hydrocarbons having at least 6 carbon atoms can be selected from the group consisting of benzene, toluene, xylenes, mesitylen, etc. and their structural isomers, or mixtures thereof.

From the above mentioned liquids, silicone oils are most preferred, since they enable a particular advantageous control of the average particle size of the obtained spherical catalyst support, as shown in FIG. 1. Thus, according to a preferred embodiment of the present invention, the liquid is consisting of a silicone oil.

According to a preferred embodiment of the present invention, the silicone oil is selected from the group consisting of polydimethylsiloxane, polydiethylsiloxane and polydipropyl-siloxane.

The viscosity of the above-mentioned liquid used in the method according to the present invention is in a range of 20 cP and 400 cP, preferably in a range of 25 cP to 300 cP, measured at 30° C. According to a particularly preferred embodiment of the present invention, the viscosity of the above-mentioned liquid is in a range of 30 cP to 120 cP, measured at 30° C.

In case the viscosity of the liquid is in the above preferred range, a particular advantageous control of the average particle size of the obtained spherical catalyst support is possible.

As described above, another critical parameter of the present method is the amount of ethanol and surfactant(s) added to the mixture of MgHal$_2$ in the liquid. It is believed that ethanol as well as the optional surfactant affects the viscosity of the melt and, therefore, has a direct relationship to the average particle size of the spherical catalyst support.

In general, the amount of ethanol added to the mixture of MgHal$_2$ and the liquid is described as molar ratio of ethanol to MgHal$_2$.

According to a preferred embodiment of the present invention the ethanol is added in an amount of 1 mol EtOH/mol MgHal$_2$ to 6 mol EtOH/mol MgHal$_2$, preferably 1 mol EtOH/mol MgHal$_2$ to 5 mol EtOH/mol MgHal$_2$ and most preferably 1.5 mol EtOH/mol MgHal$_2$ to 4 mol EtOH/mol MgHal$_2$.

According to a preferred embodiment of the present invention the method comprises the addition of one or more surfactant(s) in step b) of the present method in order to lower the viscosity of the MgHal$_2$-ethanol-adduct.

The addition of a surfactant changes the slope of the $v/\beta_{EtOH}$ ratio and adds another variable to the method, if for example comparatively larger average particle sizes are required.

According to a preferred embodiment of the present invention the surfactants are selected from the group consisting of mono-oxygen ethers, glycol ethers, polyethers, glycols, alcohols, silicates, borates and phosphates or mixtures thereof.

Examples for mono-oxygen ethers include dimethyl ether, diethyl ether, dipropyl ether, diisopropyl ether, dibutyl ether, diisobutyl ether, di-tert-butylether, dipentyl ether, diisoamyl ether, dihexyl ether, dibenzyl ether, dihexyl ether, dicyclohexyl ether, methylethyl ether, methylpropyl ether, ethylpropyl ether, methylbutyl ether, ethylbutyl ether, ethyl-tert-butyl ether, ethyl-iso-butyl ether, proyplbutyl ether, propyl-iso-butyl ether, propyl-tert-butyl ether, furan, tetrahydrofurane, benzofurane, dibenzofurane, pyrane and the like.

Examples for glycol ethers include alkylene glycol ethers and polyalkylene ethers, such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monophenyl ether, diethylene glycol monomethyl ether, diethylene glycol mono-n-butyl ether, ethylene glycol dimethyl ether, ethylene glycol diethyl ether, ethylene glycol dibutyl ether, poly(ethylene glycol) methyl ether, poly(ethylene glycol) ethyl ether, poly(ethylene glycol) propyl ether, poly(ethylene glycol) butyl ether, poly(propylene glycol) methyl ether, poly(propylene glycol) ethyl ether, poly(propylene glycol) propyl ether, poly(propylene glycol) butyl ether and the like.

Examples for polyethers include polyethylene glycols with the common formula $C_{2n}H_{4n+2}O_{n+1}$ like PEG 100, PEG 200, PEG 300, PEG 400, polypropylene glycols with the general formula $C_{3n}H_{6n+2}O_{n+1}$ and the like.

Examples for cyclic polyethers include 12-crown-4, 15-crown-5, 18-crown-6, dibenzo-18-crown-6 and the like.

Examples for silicates are tetramethylorthosilicate, tetraethylorthosilicate, tetrapropylorthosilicate, tetrabutylorthosilicate and the like.

In one embodiment of the present invention the surfactant is a mixture of an alcohol and a polyether. The alcohol is preferably decanol and the polyether is preferably PEG 200. It is further preferred that the ratio by weight of decanol/PEG 200 is from 1.1 to 4.1, The alcohols having at least 6 carbon atoms can be selected from the group consisting of alcohols having the general formula ROH, wherein R is a hydrocarbon residue having at least 6 carbon atoms, preferably 6 to 12 carbon atoms, preferably a saturated alkyl residue, such as for example hexanol, heptanol, octanol, nonanol, decanol, dodecanol and the like.

Examples for borates are trimethyl borate, triethyl borate, tripropyl borate, tributyl borate, and the like.

Examples for phosphates are trimethyl phosphate, triethyl phosphate, tripropyl phosphate, tributyl phosphate, tri-tert-butyl phosphate and the like.

Preferably, the surfactant is selected from the group consisting of decanol, PEG 200, tetraethoxysilicate, triethoxyborate and tributylphosphate.

According to a preferred embodiment of the present invention the surfactant is added in an amount of 0.05 mol surfactant/mol $MgHal_2$ to 1.5 mol surfactant/mol $MgHal_2$, more preferred in an amount of 0.1 mol surfactant/mol $MgHal_2$ to 1.2 mol surfactant/mol $MgHal_2$, in particular in an amount of 0.3 mol surfactant/mol $MgHal_2$ to 1.0 mol surfactant/mol $MgHal_2$.

According to a preferred embodiment of the present invention, Hal in the general formula $MgHal_2$ is Cl.

Further, the present invention provides a spherical catalyst support, consisting of particles of a $MgHal_2$-ethanol-adduct, wherein Hal is selected from the group consisting of Cl, Br and F, having an average particle size $d_{50}$ in a range of 10 μm to 150 μm and a $(d_{90}-d_{10})/d_{50}$ value of 1.05 to 1.7.

The spherical catalyst support obtained by the method according to the present invention has a substantially spherical shape, a comparatively small average particle size and a comparatively narrow particle size distribution.

The average particle size $d_{50}$ of the particles obtained with the method according to the present invention is between 10 μm and 150 μm, preferably between 20 μm and 120 μm and most preferably between 20 μm and 100 μm. In a preferred embodiment of the present invention, the method is especially suitable for the production of very small spherical catalyst supports having an average particle size between 20 μm and 75 μm.

The span $((d_{90}-d_{10})/d_{50})$ is more preferably 1.05 to 1.5, in particular 1.05 to 1.3.

According to a preferred embodiment of the present invention, the $MgHal_2$-ethanol-adduct has the formula $MgHal_2 \times q$ ethanol, wherein q is in a range of 1 to 5, more preferably wherein q is in a range of 1.3 to 4 and in particular wherein q is in a range of 1.5 to 2.9.

Further, the present invention provides a solid catalyst composition, comprising the spherical catalyst support according to the present invention, a Ti-containing compound and one or more electron donor compound(s).

For the preparation of the solid catalyst composition according to the present invention, the present spherical catalyst support is treated with a Ti-containing compound once or several times. If the solid catalyst composition comprises only one electron donor compound, the electron donor compound can be added in one or several treatment steps. If the solid catalyst composition comprises more than one electron donor compound, the electron donor compounds are either added contemporaneously or, if the treatment with the Ti-containing compound is done in several steps, the electron donor compounds can be added consecutively in all possible ways.

Prior to the treatment with the Ti-containing compound, the support can be dried and/or dealcoholated after the solidification to achieve the most preferred molar EtOH ratio, which is between 1.5 and 2.9, relative to one mol $MgHal_2$. The drying and dealcoholation method can be carried out at elevated temperatures between 50° C. and 130° C. and/or at a reduced pressure.

According to a preferred embodiment of the present invention, the Ti-containing compound is represented by the general formula $Ti(OR)_{m-x}Y_x$, wherein R is a linear or branched $C_{1-10}$-alkyl group, Y is Cl, Br or I, m is 3 or 4 and x is 1, 2, 3 or 4.

Preferred Ti-compounds are $TiCl_3$ and $TiCl_4$.

In another known preparation method the spherical catalyst support according to the present invention is milled together with the electron donor(s) and is subsequently treated with a solution of $TiCl_4$. Generally, the obtained product of both preparation methods is washed with a hydrocarbon to remove undesired by-products.

The electron donor compounds can be selected from one or more of the group consisting of phthalates, diethers, succinates and glycols. Preferred combinations of electron donor compounds comprise phthalate/diether-, phthalate/succinate- or phthalate/glycol-mixtures. Such internal donors combinations are known.

According to a preferred embodiment of the present invention, the weight ratio of the spherical catalyst support to the electron donor compound in the solid catalyst composition is in the range of 0.1 to 50.

Based on the methods described above, one method for preparing the solid catalyst composition according to the present invention comprises the treatment of the spherical catalyst support according to the present invention with a solution of $TiCl_4$ and one or more electron donor compound(s) in excess at an elevated temperature for a certain period. The elevated temperature is preferably in a range of 50° C. to 150° C. After this treatment, the obtained product is preferably washed with a hydrocarbon solvent until all undesired by-products are removed.

The solid catalyst composition may be further activated with a chlorohydrocarbon, such as chlorobenzene, chloromethane, dichloromethane or 1,2-dichloroethane, at an elevated temperature for a period of 1 to 10 hours, and is preferably subsequently washed with an inert hydrocarbon solvent.

In yet another method, the virgin or partially dried and/or dealcoholated spherical catalyst support according to the present invention is suspended in a cold $TiCl_4$ solution and the obtained suspension is heated up to a temperature between 70° C. and 150° C. and kept at this temperature for 0.5 hours to 3 hours. This procedure can be carried out one or more times. The electron donor compound(s) is/are either added to the $TiCl_4$ solution together in one step or added separately in two or more steps. Subsequently, the obtained product is preferably washed with an inert hydrocarbon to remove undesired by-products and excess $TiCl_4$.

Further, the present invention provides the use of the solid catalyst composition according to the present invention for polymerization of olefins, in particular α-olefins.

In order to initiate the olefin polymerization, the above described solid catalyst composition has to be activated. The activation of the solid catalyst composition is preferably accomplished by the reaction of the solid catalyst composition with an organoaluminum compound.

The solid catalyst composition according to the present invention is particularly suitable for the polymerization of α-olefins having the general formula $H_2C=CHR$, wherein R is hydrogen or a hydrocarbon residue having 1 to 8 carbon atoms. The activation method comprises the following steps:
  a) providing a solid catalyst composition according to the present invention and
  b) reacting the solid catalyst composition with at least one organoaluminum compound having the general formula $AlR_nX_{3-n}$, wherein R is H or an alkyl group containing 1 to 20 carbon atoms, X is halogen and $1<n\leq3$, in the presence of at least one external electron donor compound.

Preferably, the organoaluminum compound $AlR_nX_{3-n}$ is an alkylaluminum compound selected from the group consisting of trialkyl aluminum compounds, alkyl aluminum halides and alkyl aluminum hydrides. In particular, preferred organoaluminum compounds $AlR_nX_{3-n}$ are selected from the group consisting of triethyl aluminum, tributylaluminum, triisobutyl aluminum, and diethyl aluminum chloride. In particular, the organoaluminum compound $AlR_nX_3$, is selected from alkylalumoxanes.

If propylene is polymerized with an activated solid catalyst composition according to the present invention it is desired to yield a polymer with a high isotacticity or isotactic index. In order to achieve a polymer with high isotacticity, an external electron donor is preferably added to the solid catalyst composition prior to the polymerization. The use of such an external electron donor usually increases the isotacticity of the polymer compared to a polymerization conducted without the external electron donor.

It is widely known that silicon compounds having the general formula $R^1{}_aR^2{}_bSi(OR^3)_c$ can be used as external electron donors, wherein $R^1$ and $R^2$ are alkyl groups containing 1 to 18 carbon atoms, wherein selected carbon atoms can be exchanged by heteroatoms, wherein preferred $R^1$ and $R^2$ groups are side-chain alkyl groups, alkenyl, alkylidene, naphthenic or aromatic groups, $R^3$ is an alkyl group containing 1 to 18 carbon atoms, wherein selected carbon atoms can be exchanged by heteroatoms, wherein preferred $R^3$ groups are alkyl groups, especially methyl, a and b each are independently of each other an integer of from 0 to 2, preferably 1, and c is an integer of from 1 to 3, preferably 2.

Preferably used external electron donors are cyclohexylmethyldimethoxysilane, diisopropyldimethoxysilane, dibutyldimethoxysilane, diisobutyldimethoxysilane, diphenyldimethoxysilane, methyl-tert-butyldimethoxysilane, dicyclopen-tyldimethoxysilane, 2-(ethyl)pyridyl-2-tert-butyldimethoxy-silane, 1,1,1-trifluoro-2-propyl-2-(ethyl)pyridyl-2-tert-butyldimethoxysilane and 1,1,1-trifluoro-2-propylmethyl-dimethoxysilane.

Furthermore, preferred silicon compounds having the above-mentioned formula also contain a branched alkyl group $R^1$ (a=1, c=3) or a naphthenic group and optionally contain heteroatoms ($R^3$ is methyl). These preferred silicon compounds include for example cyclohexyltrimethoxysilane, tert-butyltrimethoxysilane and tert-hexyltrimethoxysilane.

Silicon-free external electron donors may be selected from the group consisting of 1,3-diethers, such as 9,9-bis(methoxymethyl)fluorene, esters, such as 4-ethoxybenzoate, ketones, amines and heterocyclic compounds, such as 2,2,6,6-tetramethylpiperidine.

As described above, the use of external electron donors during the (co)polymerization of olefins, in particular propylene, yields polymers with high isotacticity and low xylene solubility (expressed as xylene soluble (XS) amount), respectively. The amount of external electron donor added to the polymerization is usually expressed as the molar ratio between the organoaluminum compound and the added external electron donor.

To control the XS value within a desired range, the external electron donor is usually added in a molar ratio between the organoaluminum compound and the added external electron donor of 0.1 to 400, more preferred of 1 to 350 and most preferred of 3 to 250.

The solid catalyst composition according to the present invention can be used in the polymerization of various olefins, in particular α-olefins having the general formula $CH_2=CHR$, as mentioned above, including ethylene, propene, 1-butene, 4-methyl-1-pentene, 1-hexene and 1-octene. According to a preferred embodiment the solid catalyst composition according to the present invention is used for the polymerization of propylene and the copolymerization of propylene and ethylene. The solid catalyst compositions according to the present invention are especially suitable for the production of polypropylene having a broader molecular weight distribution, higher isotacticity and higher activity compared to polypropylenes obtained with known catalysts. Of particular interest are polymers having a MWD (molecular weight distribution) of more than 4, a xylene soluble fraction below 5% and an activity of more than or equal to 20 $kg_{PP}/g_{cat}$.

The known production methods for polymers are diverse and can be divided in several groups. In the first group of methods the polymerization takes place in slurry phase, whereas either an inert hydrocarbon or a bulk phase, wherein the liquid monomer, for example propylene, serves as the reaction medium, is used. The second group of methods includes the so-called gas-phase method, wherein the monomer is polymerized in either agitated or fluidized bed reactors.

In all those methods the reaction conditions are very similar. The temperature during the polymerization is usually from 20° C. to 120° C., preferably from 40° C. to 80° C., and the pressure is usually in a range of from 5 bar to 100 bar, and in particular during a gas-phase polymerization preferably in a range of from 1 and 50 bar and during a slurry bulk polymerization in a range of from 1 bar to 60 bar. Further to the monomer, hydrogen is fed to the reactor in desired quantities to control the molecular weight of the polymer.

The present invention is further illustrated by the following examples, which do not limit the scope of the present invention.

Support Preparation

EXAMPLES 1 TO 6

Examples 1 to 6 are carried out in a first setup of laboratory equipment.

Step 1: In a 500 ml 3-neck round bottom flask fitted with a heating mantle, a $N_2$ inlet, a stirrer and a rubber septum for the addition of dry ethanol and other liquid substances, 130 ml of silicone oil (silicon oil producer: Hanzhou Ya Dong Xinxing Materials Factory, Zhejiang province, China. Type: 201) were added. Then 20 g (0.21 mol) of milled anhydrous $MgCl_2$ and optionally the desired amount of surfactant were added. The mixture was stirred until the $MgCl_2$ was dispersed. Subsequently, the predetermined amount of dry ethanol was transferred to the mixture via a syringe and the mixture was heated up to 125° C. and kept at this temperature for 2 hours. Subsequently, the mixture was transferred to a second flask.

Step 2: In the second 500 ml flask, 140 ml of silicone oil having the same viscosity as in the first step were charged and heated to 125° C. prior to transferring the mixture of the first flask to the second flask. The resulting mixture was stirred with a high-speed stirrer (FLUKO FA25, obtained by FLUKO Equipment Shanghai Co., Ltd., China) at 19000 rpm for 1 minute to get a homogenous emulsion of the melted $MgCl_2$-ethanol-adduct in the silicone oil, before the mixture was transferred into a third flask.

Step 3: In the third 5000 ml flask, 2400 ml hexane were charged and cooled to −25° C. The complete mixture of melted adduct in silicone oil from the second flask was transferred into the cooled hexane to solidify the substantially spherical particles of the adduct. Subsequently the solidified particles were washed several times with hexane until the oil content was less than 0.2 wt %, and then dried. Finally, the average particle size and particle size distribution of the washed and dried particles were measured.

This general procedure was executed several times with silicone oil or silicone oil mixtures with different viscosities and with different amounts of ethanol added to the mixture.

A summary of the process conditions and of the results is listed in table 1 below.

EXAMPLES 7 TO 11

Examples 7 to 11 are carried out in a second setup of laboratory equipment.

Step 1: In a 8 L reactor, 3 l of silicone oil (Silicon oil producer: Hanzhou Ya Dong Xinxing materials Factory, Zhejiang province, China. Type: 201) were added. Afterwards, 0.4 kg (4.2 mol) of milled anhydrous $MgCl_2$ were added. The mixture was stirred until the $MgCl_2$ was dispersed. Subsequently, the predetermined amount of dry ethanol was transferred to the mixture and the mixture was heated up to 125° C. and was kept at this temperature for 4 to 5 hours. Subsequently, the mixture was transferred to a second reactor.

Step 2: In the second 30 l reactor, 4 l of silicone oil having the same viscosity as in the first step were charged and heated to 125° C. prior to transferring the mixture of the first reactor into the second reactor. The resulting mixture was stirred with a high-speed stirrer at 850 rpm for 1 hr to obtain a homogenous emulsion of the melted $MgCl_2$-ethanol-adduct in the silicone oil, before the mixture was transferred into a third reactor.

Step 3: In the third 250 l reactor, 120 l hexane were charged and cooled to −20° C. The complete mixture of melted adduct in silicone oil from the second reactor was transferred into the cooled hexane to solidify the substantially spherical particles of the adduct. Subsequently the solidified particles were washed several times with hexane until the oil content was less than 0.2 wt %, and then dried.

Finally, to determine the average particle size and particle size distribution, the washed and dried particles were measured.

A summary of the process conditions and of the results is listed in table 1 below.

TABLE 1

| Example | Viscosity of the liquid [cp] | EtOH content [mol/mol $MgCl_2$] | Viscosity/EtOH ratio | Surfactant | Surfactant Content [mol/mol $MgCl_2$] | $d_{50}$ [μm] | Span |
|---|---|---|---|---|---|---|---|
| 1 | 91 | 2.9 | 31.4 | $Si(OEt)_4$ | 0.32 | 43 | 1.22 |
| 2 | 80 | 2.9 | 27.6 | $Si(OEt)_4$ | 0.43 | 53 | 1.26 |
| 3 | 67 | 2.9 | 23.1 | $Si(OEt)_4$ | 0.7 | 70 | 1.07 |
| 4 | 100 | 2.9 | 34.5 | — | — | 29 | 1.57 |
| 5 | 87 | 2.9 | 30.0 | — | — | 47 | 1.34 |
| 6 | 75 | 2.9 | 25.9 | — | — | 63 | 1.23 |
| 7 | 86 | 2.8 | 30.7 | — | — | 22 | 1.53 |
| 8 | 84 | 2.9 | 29.0 | — | — | 28 | 1.69 |
| 9 | 61 | 2.9 | 21.0 | — | — | 38 | 1.65 |
| 10 | 56 | 2.9 | 19.3 | — | — | 46 | 1.3 |
| 11 | 41 | 2.9 | 14.1 | — | — | 56 | 1.68 |

COMPARATIVE EXAMPLES 1 TO 5

Step 1: In a 500 ml 3-neck round bottom flask fitted with a heating mantle, a $N_2$ inlet, a stirrer and a rubber septum for the addition of dry ethanol and other liquid substances, 90 ml of paraffin oil, 80 ml of silicone oil and 20 g of $MgCl_2$ were mixed at room temperature with stirring at 600 rpm (with a stirrer obtained from Shanghai SENCO Technology Co., Ltd., China). Then the predetermined amount of dry ethanol was added to the mixture and, subsequently, the temperature of the mixture was increased to 125° C.

Step 2: To a second 500 ml 3-neck round bottom flask 100 ml of silicone oil were added and also heated to 125° C. The $MgCl_2$/paraffin oil/silicone oil mixture of the first flask was transferred into the silicone oil contained in the second flask. The resulting mixture was stirred with a high-speed stirrer (FLUKO FA25) at 19000 rpm for 1 minute to get a homogenous emulsion of the melted $MgCl_2$-ethanol-adduct in the liquid, before the paraffin oil/silicone oil mixture was transferred into a third flask.

Step 3: In the third 5000 ml flask, 2400 ml hexane were charged and cooled to −25° C. The mixture of melted adduct from the second flask was transferred into the cooled hexane to solidify the substantially spherical particles of the adduct. Subsequently, the solidified particles were washed several times with hexane until the oil content was less than 0.2 wt %, and then dried.

Finally, the average particle size and particle size distribution of the washed and dried particles were measured.

The average particle size and the particle size distribution of the obtained spherical catalyst supports and the viscosity of the liquid were determined as follows:

Average particle size and particle size distribution

A Malvern Mastersizer (obtained from Malvern Instruments GmbH, Germany) was used to measure the average particle size and the particle size distribution of the spherical catalyst support. For the measurement, the spherical catalyst support was suspended in n-hexane (A.R. grade). The span (particle size distribution) was determined according to following equation: span=$(d_{90}-d_{10})/d_{50}$.

Viscosity

An NDJ-95 viscometer (Shanghai Precise Scientific Instrument Company, China) was used to measure the viscosity at 30° C.

A summary of the results is listed in table 2 below.

TABLE 2

| Comparative Example | Viscosity of the liquid [cp] | EtOH content [mol/mol MgCl$_2$] | Viscosity/EtOH ratio | Surfactant | Surfactant Content [mol/mol MgCl$_2$] | $d_{50}$ [μm] | Span |
|---|---|---|---|---|---|---|---|
| 1 | 79  | 2.9 | 27.2 | | | 74 | 1.03 |
| 2 | 93  | 2.9 | 32.1 | | | 59 | 1.82 |
| 3 | 124 | 2.9 | 42.8 | | | 73 | 1.28 |
| 4 | 150 | 2.9 | 51.7 | | | 81 | 1.16 |
| 5 | 180 | 2.9 | 62.1 | | | 90 | 1.06 |

Furthermore, the correlation between the average particle size $d_{50}$ and the viscosity/EtOH-ratio on the basis of examples 1 to 11 and comparative examples 1 to 5 has been determined.

The results of said determination are shown in FIG. 1. According to FIG. 1 the correlation between the average particle size $d_{50}$ and the viscosity/EtOH-ratio in examples 1 to 11 is a linear relationship, whereas the correlation is a non-linear relationship with respect to comparative examples 1 to 5.

The comparative examples show a non-linear correlation because there are agglomerations of the support particles and therefore a larger D50-value despite the higher viscosity.

Catalyst Preparation:

Examples 12 to 15 and Comparative Examples 6 and 7

To a 500 ml 3-neck flask fitted with a thermostatic jacket, a N$_2$ inlet, a stirrer and a rubber septum for the addition of a spherical catalyst support and other substances, 250 ml of TiCl$_4$ were added and cooled down to −20° C., and then 10 g of spherical support obtained in the examples 6, 7 10 and 11 and in the comparative examples 1 and 2, respectively, were gradually added. After the support addition was finished, the temperature was increased to 40° C. At this temperature the predetermined amount of diisobutylphthalat (DiBP) was added to the flask and subsequently the temperature was raised to 100° C. and kept for 1.5 hours. After this time period, the liquid was removed by filtration and 120 ml of fresh TiCl$_4$ were added and reacted with the support at 125° C. for additional 1.5 hrs. The solid catalyst composition was allowed to settle and the liquid was again removed by filtration. This method was repeated for a second time and then the obtained solid catalyst composition was washed several times with hexane, until the Ti content of the collected wash water was less than 0.05 mg/ml.

The properties and the activity of the obtained solid catalyst composition were measured with the following methods.

Average Particle Size:

The average particle size was measured as described above with a Malvern Mastersizer.

Components Analysis

A spectrophotometer (723P, Shanghai Spectrum Instrument Company, China) was used to measure the Ti content in the solid catalyst composition and gas chromatography (Agilent 6820, obtained from Agilent Technologies Deutschland GmbH, Germany) was used to measure the phthalate content in the solid catalyst composition.

Evaluation of the Activity of the Solid Catalyst Composition (Bulk Polymerization)

In a 5 L stainless steel high pressure reactor equipped with an agitator, pressure gauge, thermometer, catalyst feeding system, liquid feeding system and thermostatic jacket, 10 to 15 mg of a solid catalyst composition obtained in the above manner, along with 2.5 mmol triethylaluminum (TEA), 0.1 mmol cyclohexyldimethoxymethyl silane (CHMMS), 0.04 mol H$_2$ and 2.3 L liquid propylene, were added and then heated to 70° C. in 10 to 15 minutes and kept at this temperature for 1 hour. The unreacted monomer was removed and a polypropylene powder was obtained. The solid catalyst composition activity was calculated by the following formula:

Activity=weight(polymer,g)/weight(catalyst,mg)

Furthermore, the properties of the obtained polypropylene were measured with the following methods.

Melt Index

The melt index was measured according to ASTM D1238-2004a.

Bulk Density

The bulk density was measured according to ASTM D 1895-96 (2003).

Xylene Soluble Amount (XS)

The measurement was carried out according to ISO 16152: 2005 (Xylene soluble; XS). In particular, an Oxford Nuclear magnetic resonance desktop measurer (OXFORD mini Case MARAN Ultra) was used to test the isotacticity and the xylene soluble amount (XS), respectively, of the polypropylene. For the measurement, 5 g (±0.001 g) of polymer were dried at 130° C. in a vacuum oven for 2 hours before being introduced into a glass tube suitable for the measurement. The tube containing the dried polymer was kept in a water bath for approximately 30 minutes to adjust the temperature at 40° C. Subsequently, the tube was installed in the sample holder of the NMR instrument and the resonance curve is measured. The isotacticity and XS, respectively, were calculated by comparing the measured curve with a standard curve.

A summary of the catalytical performance of the solid catalyst compositions obtained in the above manner is given in table 3 below and shows the competitive performance of the solid catalyst compositions supported by the spherical catalyst support according to the invention.

TABLE 3

| Support | | Catalyst/Polypropylene | | | | | | | |
|---|---|---|---|---|---|---|---|---|---|
| Example | $d_{50}$ [μm] | Example | $d_{50}$ [μm] | Ti [%] | DiBP [%] | Activity [kgPP/gcat] | Melt Index [g/10 min] | Bulk density [g/ml] | XS [%] |
| 6 | 63 | 16 | 44.04 | 3.46 | 7.50 | 37.63 | 8.36 | 0.476 | 2.50 |
| 7 | 22 | 17 | 20.79 | 2.91 | 8.33 | 38.77 | 10.83 | 0.454 | 3.65 |
| 10 | 46 | 21 | 35.21 | 2.54 | 6.97 | 39.39 | 10.49 | 0.462 | 2.00 |
| 11 | 56 | 22 | 42.32 | 3.61 | 6.51 | 41.30 | 11.06 | 0.468 | 3.46 |
| Comp. Example | $d_{50}$ [μm] | Comp. Example | $d_{50}$ [μm] | | | | | | |
| 1 | 74 | 6 | 53.82 | 3.28 | 12.58 | 33.98 | 7.20 | 0.458 | 1.86 |
| 2 | 59 | 7 | 44.98 | 3.04 | 11.89 | 35.19 | 6.20 | 0.499 | 1.59 |

What is claimed:

1. A method for adjusting the average particle size of a spherical catalyst support, comprising the steps:
   a) providing a liquid which is immiscible with a $MgHal_2$-ethanol-adduct;
   b) adding $MgHal_2$, wherein Hal is selected from the group consisting of Cl, Br and F, to the liquid and dispersing it therein;
   c) adding ethanol to the dispersion obtained in step b) in an amount β [mol/mol $MgHal_2$], such that ν [cP]/β [mol/mol $MgHal_2$] is in a range of 13 to 35, to form a $MgCl_2$-ethanol-adduct, and heating the obtained mixture such that the $MgHal_2$-ethanol-adduct is molten, wherein ν [cP] is the viscosity of the liquid provided in step a);
   d) adding the mixture obtained in step c) to the same liquid as used in step a), wherein the liquid is heated such that the $MgHal_2$-ethanol-adduct is kept in the molten state, and homogenizing the obtained mixture; and
   e) transferring the homogenized mixture obtained in step d) into a hydrocarbon liquid cooled to a temperature in a range of −30° C. to 0° C.

2. The method according claim 1, wherein the liquid is selected from the group consisting of silicone oil, aliphatic hydrocarbons having at least 8 carbon atoms and aromatic hydrocarbons having at least 6 carbon atoms.

3. The method according to claim 2, wherein the liquid is a silicone oil.

4. The method according to claim 3, wherein the silicone oil is selected from the group consisting of polydimethylsiloxane, polydiethylsiloxane and polydipropylsiloxane.

5. The method according to claim 1, wherein the viscosity ν of the liquid is in a range of 30 cP to 120 cP, measured at 30° C.

6. The method according to claim 1, wherein the ethanol is added in an amount of 1 mol ethanol/mol $MgCl_2$ to 6 mol ethanol/mol $MgCl_2$.

7. The method according to claims 1, wherein one or more surfactant(s) is/are added in step b).

8. The method according to claim 7, wherein the surfactant is selected from the group consisting of silicates, borates and phosphates.

9. The method according to claim 7, wherein the surfactant is a mixture of an alcohol and a polyether.

10. The method according to claim 7, wherein the surfactant is added in an amount of 0.05 mol surfactant/mol $MgHal_2$ to 1.5 mol surfactant/mol $MgHal_2$.

11. The method according to claim 1, wherein Hal is Cl.

* * * * *